(12) United States Patent
Caussat

(10) Patent No.: US 6,933,694 B2
(45) Date of Patent: Aug. 23, 2005

(54) CONTROL FOR ELECTRIC MOTOR IN VEHICLES

(75) Inventor: Thierry Roger Caussat, West Bloomfield, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/720,813

(22) Filed: Nov. 24, 2003

(65) Prior Publication Data

US 2005/0110445 A1    May 26, 2005

(51) Int. Cl.$^7$ ............................................. H02P 1/04
(52) U.S. Cl. .................. 318/461; 318/286; 318/443; 318/445; 318/446; 180/286; 701/49
(58) Field of Search ..................... 318/280–293, 318/430–446, 460–469; 180/288, 289; 701/49

(56) References Cited

U.S. PATENT DOCUMENTS

| | | | | |
|---|---|---|---|---|
| 5,334,876 A | * | 8/1994 | Washeleski et al. ........ | 307/10.1 |
| 5,422,551 A | * | 6/1995 | Takeda et al. ............... | 318/265 |
| 5,459,379 A | * | 10/1995 | Takeda et al. ............... | 318/469 |
| 5,483,133 A | * | 1/1996 | Takabe et al. ............... | 318/466 |
| 5,530,329 A | * | 6/1996 | Shigematsu et al. ........ | 318/469 |
| 5,585,702 A | * | 12/1996 | Jackson et al. .............. | 318/266 |
| 5,616,997 A | * | 4/1997 | Jackson et al. .............. | 318/467 |
| 5,650,698 A | * | 7/1997 | Ito et al. ...................... | 318/282 |
| 5,723,960 A | * | 3/1998 | Harada ......................... | 318/469 |
| 5,983,567 A | * | 11/1999 | Mitsuda ........................ | 49/26 |
| 5,994,858 A | * | 11/1999 | Miura ........................... | 318/283 |
| 6,034,495 A | * | 3/2000 | Tamagawa et al. .......... | 318/266 |
| 6,034,497 A | * | 3/2000 | Tamagawa et al. .......... | 318/466 |
| 6,043,620 A | * | 3/2000 | Koestler ....................... | 318/282 |
| 6,054,822 A | * | 4/2000 | Harada ......................... | 318/434 |
| 6,064,165 A | * | 5/2000 | Boisvert et al. ............. | 318/465 |
| 6,274,947 B1 | * | 8/2001 | Terashima ................... | 307/10.1 |
| 6,298,295 B1 | * | 10/2001 | Tyckowski ................... | 701/49 |
| 6,426,604 B1 | * | 7/2002 | Ito et al. ...................... | 318/466 |
| 6,555,982 B2 | * | 4/2003 | Tyckowski ................... | 318/465 |
| 6,563,279 B2 | * | 5/2003 | Sugawara ..................... | 318/443 |
| 6,573,676 B1 | * | 6/2003 | Klesing ........................ | 318/445 |
| 6,580,241 B1 | * | 6/2003 | Sugawara ..................... | 318/443 |
| 6,667,590 B2 | * | 12/2003 | Nagaoka ....................... | 318/286 |
| 6,690,129 B1 | * | 2/2004 | Sutter et al. ................. | 318/254 |
| 6,713,977 B1 | * | 3/2004 | Sutter et al. ................. | 318/254 |
| 6,788,016 B2 | * | 9/2004 | Whinnery ..................... | 318/468 |
| 2002/0024308 A1 | * | 2/2002 | Kato et al. ................... | 318/445 |
| 2002/0024310 A1 | * | 2/2002 | Hirose et al. ................ | 318/445 |
| 2002/0030459 A1 | * | 3/2002 | Sugawara ..................... | 318/443 |
| 2002/0149334 A1 | * | 10/2002 | Nagaoka ....................... | 318/445 |
| 2002/0180390 A1 | * | 12/2002 | Tyckowski ................... | 318/445 |
| 2003/0189415 A1 | * | 10/2003 | Fitzgibbon ................... | 318/466 |
| 2004/0065498 A1 | * | 4/2004 | Onozawa et al. ............ | 180/286 |

* cited by examiner

Primary Examiner—Paul Ip
(74) Attorney, Agent, or Firm—Jacox Meckstroth & Jenkins

(57) ABSTRACT

A control for an electric motor in a vehicle. The control ascertains whether an obstacle is interfering with rotation of the motor. The control establishes a baseline speed, representing normal free running speed of the motor. This baseline speed will be different, in different operating environments. Then the control determines whether measured motor speed drops below the baseline speed by a predetermined amount. If so, then the motor is shut down, or reversed.

46 Claims, 7 Drawing Sheets

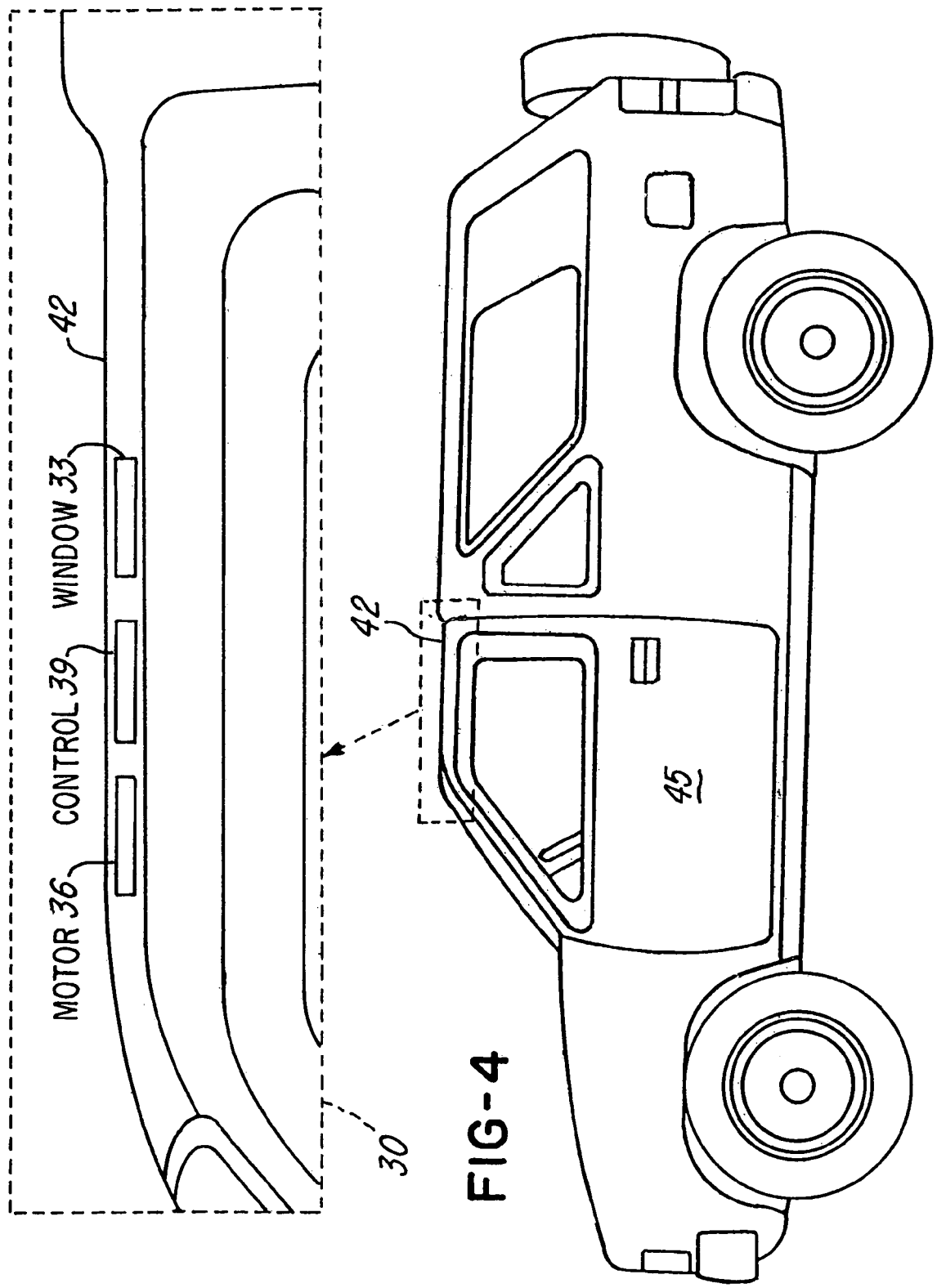

$$Tf_{(k)} = \frac{\sum_{i=k}^{k-n} T_i}{n} \qquad \text{EQUATION (1)}$$

$$\Delta T_{(k)} = (Tf_{(k)} - Tf_{(k-1)}) \qquad \text{EQUATION (2)}$$

$$RS_{(k)} = \sum_{x=0}^{x=k} \Delta T_{(x)} \qquad \text{EQUATION (3)}$$

$$Trs(x) = \int \left( \left[ \frac{d(Tf(x))}{dx} \right] \right) dx + IC \qquad \text{EQUATION (4)}$$

$$Trs(x) = \left[ \int \left( \frac{d(Tf(x))}{dx} \right) dx + IC(=0) \right]^{Saturated\,to\,ZERO} \qquad \text{EQUATION (5)}$$

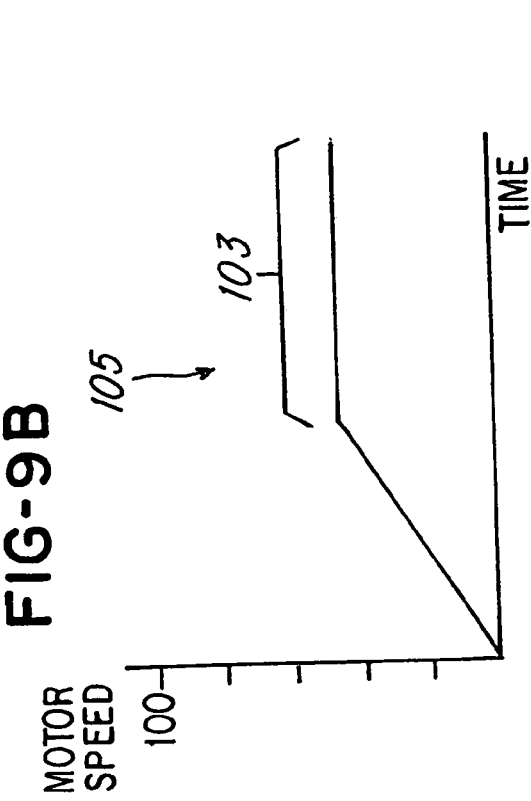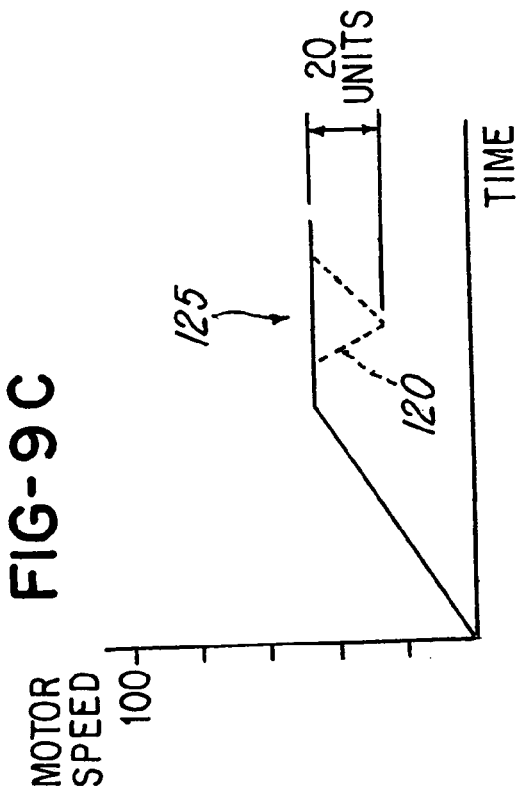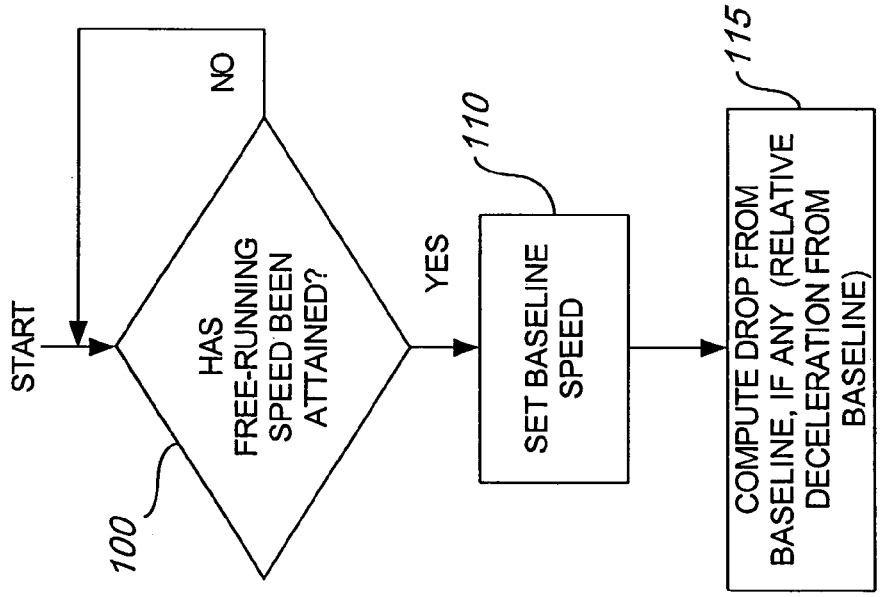

CONTROL FOR ELECTRIC MOTOR IN VEHICLES

The invention relates to control systems for an electric motor in a vehicle, and particularly to control systems which detect obstacles present in the path of a component which is moved by such a motor. For example, the motor may operate a window. If a small child places his hand in the path of the moving window, the invention detects contact of the window with the hand, and stops, or reverses, the window.

BACKGROUND OF THE INVENTION

FIG. 1 illustrates a motor vehicle 3, which contains a sun roof (not shown) within dashed box 6. FIG. 2 is a view, looking downward, onto the sun roof 9. If, in FIG. 3, an obstruction 10 is present which blocks closure of the glass window 12, motion of the window 12 should generally be stopped, or reversed.

Various stratagems exist in the prior art to achieve this stoppage. Clutches are used, which stop motion of the window 12 when the window 12 strikes the obstruction 10. The obstruction 10 causes an opposing force which overrides the clutch.

Also, sensors are used, which sense the presence of objects in the path of the window 12. Other sensors are used which sense electrical parameters of the motor driving the window. For example, current drawn by the motor can increase when load on the motor increases. Obstruction 10 increases the load, when the window 12 meets the obstruction 10. A system can detect the resulting increase in current, and shut down, or reverse, the motor in response.

OBJECTS OF THE INVENTION

An object of the invention is to provide an improved control system for detecting an obstruction in the path of a component which is moved by an electric motor.

A further object of the invention is to provide an improved control system for electrically actuated windows in motor vehicles.

SUMMARY OF THE INVENTION

One objective of this invention is to define a method to remove the underlying quasi-constant free speed time increment (Tfs)=1/(n*speed), and to ignore subsequent acceleration intervals after the first attainment of the free-running speed during start-up of a motor.

In one form of the invention, a motor is used which reaches different free running speeds in different environments. The invention determines the particular free running speed in a given environment, and then measures speed thereafter to determine whether actual speed drops below the free running speed by a specified amount. If so, it is concluded that the motor has encountered an obstacle, and the motor is shut down or reversed.

BRIEF DESCRIPTION OF THE DRAWINGS

FIG. 4 illustrates one form of the invention.

FIGS. 9A, 9B, 9C and 10A and 10B are flow charts illustrating processes undertaken by one form of the invention.

DETAILED DESCRIPTION OF THE INVENTION

Figure 1:
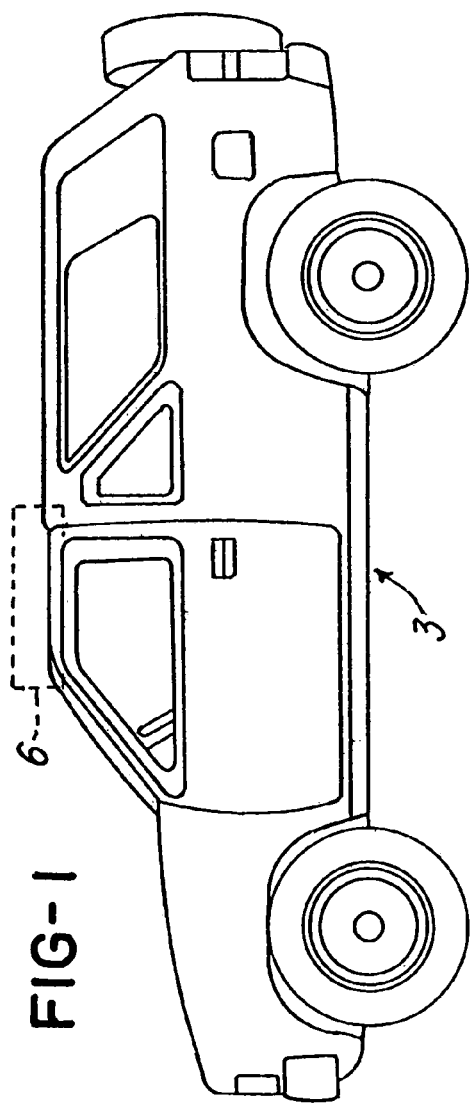
FIG. 1 illustrates a vehicle found in the prior art.

FIG. 4 illustrates one form of the invention. Within magnified insert 30, a window 33 in the form of a sun roof is shown. An electric motor 36, under supervision of a control 39, actuates the window 33. The motor 36 and control 39 are indicated as being located within the roof 42 of the vehicle 45, but other locations are possible.

FIG. 5 shows idealized plots showing speed-time behavior of the motor 36 in FIG. 4, under different combinations of system voltage and temperature.

The system voltage can vary substantially depending on various external effects such as, but not exclusively restricted to, climatic conditions (temperature, humidity, etc.) and vehicle running conditions (running at speed, idling, stopped, etc.). The system voltage, for the purposes of this invention, can therefore effectively vary from 0V for a flat battery up to approximately 16V depending on the voltage regulator.

Additionally, the resistance loads (friction, drag, etc.) applied to the system will vary depending on numerous phenomena such as, but not limited to, the change of material characteristics (stiffness, flexibility, contact friction, etc.) at low and high temperature, the relative expansion of different materials creating increased or decreased resistance due to variable interference, etc.

For the purposes of this invention, the variability of system voltage and system resistance loads need not be assumed to either increase or decrease in any particular manner in relationship to the external influences. However, it is assumed that the particular system under consideration at any one time will for a particular voltage level and corresponding temperature level, result in a stable velocity (free running speed) after an initial transient start-up time.

The system voltage can assume rather widely differing values. For example, when the engine (not shown) of the vehicle 45 is not running, the system voltage will correspond to the voltage of the battery (not shown), which will ordinarily be about 12 volts, for a healthy battery.

However, when the vehicle 45 is running, the system voltage will be dictated by the voltage regulator of the charging system (not shown), and that voltage is generally around 16 volts, for a passenger car in the United States in the year 2003.

Further, if the vehicle 45 is not running, and the battery has been subject to very cold conditions, the battery voltage may fall below 12 volts.

Further still, the cold temperature drastically reduces the rate of reactions within the electrochemical cells of the battery, so that, even if the measured battery voltage is 12 volts, the amount of current which the battery can deliver is significantly reduced.

From another point of view, the cold temperature increases the internal resistance of the battery. The battery can be modeled as an ideal voltage source 50 in series with that internal resistance 53, as shown in FIG. 5. When that resistance increases, any current drawn from the battery, as by running motor 36 in FIG. 4, causes a voltage drop across the resistor 53, thereby reducing the voltage at point P, which is the terminal voltage of the battery.

Therefore, for various reasons, the voltage which the battery of the vehicle 45 produces changes under different operating conditions.

Another factor affecting performance of motor 36 is the ambient temperature. For example, at warm temperatures, such as 85 F., lubricants are relatively soft. Gaskets and water seals, which surround window 33 in FIG. 4, are pliant and flexible, and so on. However, at cold temperatures, such as 10 F., lubricants become stiffer. This increased stiffness causes bearings which motor 36 in FIG. 4 must rotate to offer more resistance, or drag. Also, gaskets and water seals become stiffer, thus applying drag to the window 33.

Therefore, for various reasons, at low temperatures, the motor 36 in FIG. 4 faces a higher load, or drag, than at high temperatures. FIG. 5 illustrates this in a qualitative way.

Plot 60 in FIG. 5 illustrates acceleration of a generalized motor at high temperature, and at high system voltage. Plot 60 would apply, for example, on a hot day of 90 F., when the engine of the vehicle 45 in FIG. 4 is running. The motor accelerates from a stop, to a free running speed, which it reaches at time T1.

Free running speed refers to the speed which the motor attains at its normal load. For example, motor 36 in FIG. 4 would reach a certain free running speed when it opens, or closes, window 33.

Plot 70 in FIG. 5 illustrates acceleration of a generalized motor at low temperature, and at low system voltage. Plot 70 would apply, for example, on a cold day of 10 F., when the engine of the vehicle 45 in FIG. 4 is not running. It is observed that the motor reaches a free running speed which is less than that of plot 60. Further, it may happen that the free running speed in plot 70 is reached at a later time T2, than is the case in plot 60, where the free running speed is reached at time T1.

Two other situations are possible: (1) High system voltage with low ambient temperature and (2) low system voltage and high ambient temperature. In these two cases, motor performance can be expected to lie within an area bounded by the curves of plots 60 and 70. Hatched areas 80 and 85 represent those areas.

Therefore, FIG. 5 illustrates that the free running speed of a motor within vehicle 45 in FIG. 4, including motor 36, can be expected to change, depending on system voltage and ambient temperature. This can create problems when one attempts to infer the presence of an obstruction which alters speed of the motor, by computation based on speed of the motor.

For the purposes of this invention, it is assumed that some form of sensing device (Hall, potentiometer, etc) can measure the incremental time interval between adjacent poles of an adequate number (usually, but not restricted to, 2 to 16) of equally spaced poles or teeth around the system motor drive shaft. For example, in the case of a 16 pole sensor, the time increment for each of the 16 consecutive 1/16 of a revolution is stored for later post-treatment.

For example, it is common to measure speed of the motor by attaching a toothed wheel to the motor. Assume a wheel having 16 teeth. A sensor is placed adjacent the toothed wheel, and each tooth induces a pulse in the sensor. In this example, 16 pulses. are produced per revolution. Measuring the time required to produce 16 pulses thus indicates the time to achieve one revolution and a simple computation gives motor speed in rpm.

Figure 3:
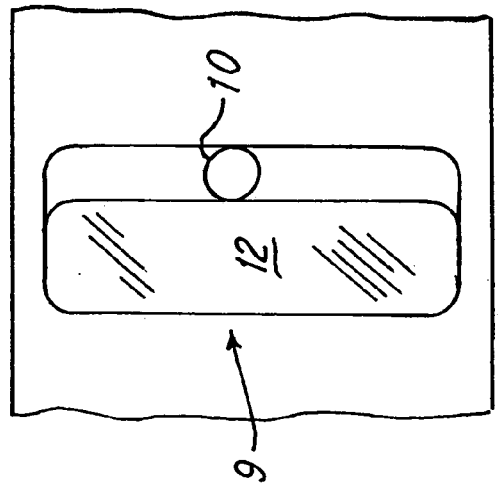
FIG. 3 shows an obstacle 10 in the path of window 12 in the sun roof 9 of FIG. 2.
Figure 2:
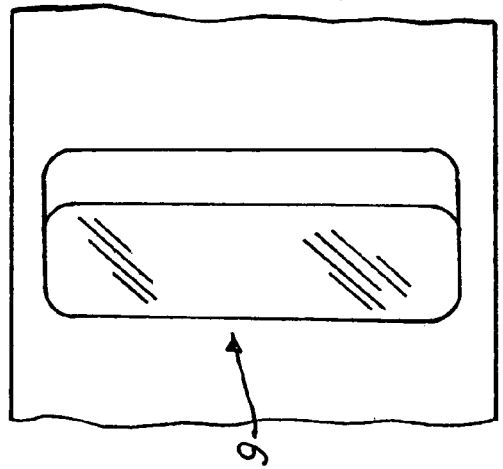
FIG. 2 is a view of the roof of the vehicle of FIG. 2, showing a sun roof 9.

However, motor speed is not constant, and depends on factors such as system voltage and ambient temperature, as FIG. 5 indicates. Of course, one can detect the situation wherein the motor 36 strikes an immovable object, as when a concrete block, or other very hard, stiff, object takes the position of obstruction 10 in FIG. 3: motor speed drops to zero. That drop, in general, is easily detected.

Nevertheless, less extreme situations pose problems. Suppose that obstruction 10 takes the form of a soft sponge, or a child's hand. The speed behavior of FIG. 5 indicates that detection of this type of obstruction may be difficult, or at least fraught with problems.

The invention eliminates, or reduces, these problems, as will now be described.

As previously explained, multiple time increments corresponding to the number of teeth around the system motor shaft, are recorded (e.g. for a 16 pole sensor, 16 time increments are recorded corresponding to 1/16 of a revolution of the motor shaft). These time increments are defined to be Ti.

It can be seen that various of Ti is inversely proportional to the motor shaft speed.

A simple form of filtering is employed to removed, among other effects but not restricted thereto, the influence of manufacturing tolerances on the relative circumferential positioning of the multiple poles of the sensor. After the completion of one full revolution, and thereafter for each incremental part of a revolution (1/n revolution), the instantaneous time increment (Tf(k)) is calculated to be the average of the sum of previous "n" time increments Ti as indicated by Equation 1 in FIG. 6, where n=the number of sensor poles or teeth.

Figure 5A:
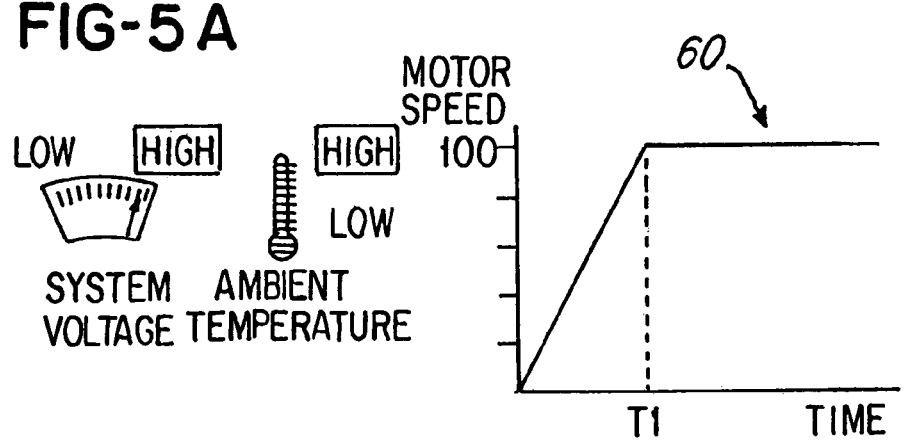
FIGS. 5A–5D illustrate four different combinations of temperature and system voltage under which the motor 36 of FIG. 4 can operate.
Figure 5B:
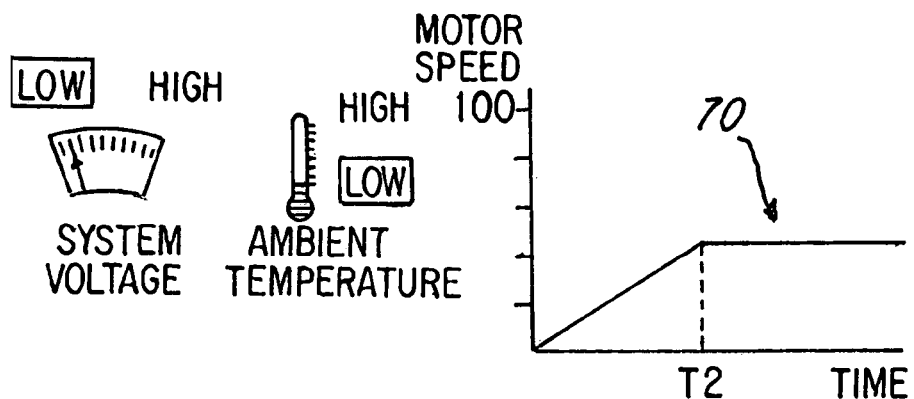
Figure 5C:
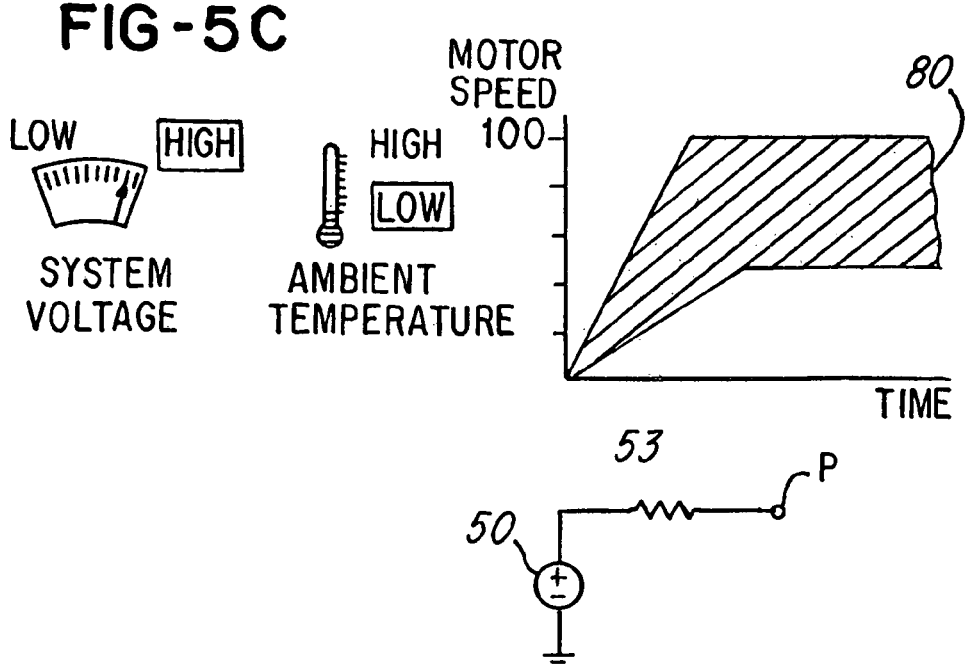
Figures 5D, 6:
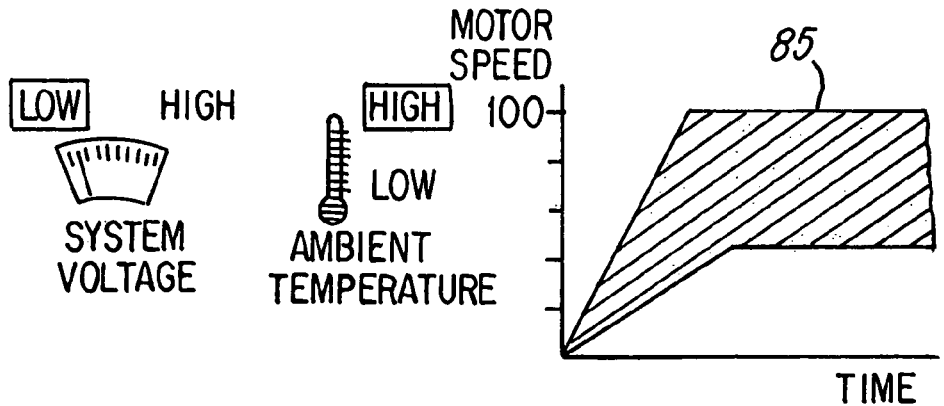
FIG. 6 illustrates equations utilized by the invention.

At any instant in time the derivative of the time increment Tf(k) can be calculated according to Equation 2 in FIG. 6. Additionally, at any instant in time the integral of the summation of the derivatives of the time increments ((T(x)), which we will subsequently refer to as the Relative Speed (RS), can be defined according to Equation 3 in FIG. 6.

It can be seen that at start-up the motor will accelerate (T(x) negative) from a stationary condition (T(I)infinite) towards a nominal free speed, corresponding to the prevailing operating conditions of the system. During this start-up phase the derivative of time increments (T(x)) will progressively decrease in magnitude (being negative) towards a theoretical value of zero (corresponding to a constant non-fluctuating speed).

The start-up phase is considered to have ended when the first time increment (T(x)) exhibits a value of zero, or a positive value is obtained, corresponding to either an effective stabilized speed or an actual deceleration point. At this point in time a variable defined as Trs is set to be zero.

The variable Trs measures the resulting summation of the time increment derivatives ((T(x)) as follows:
 a) in all cases when they have a positive value
 b) when negative whilst the on going Trs summation remains larger than the negative ((T(x)) value.

Note: Trs has a minimum absolute value of zero. In the event of a negative (T(x)) value greater than the positive current Trs, Trs is set=zero. Trs remains at zero until positive values of (T(x)) are measured again.

It can be seen that Trs is a measure of the effective deceleration of the system under consideration with relationship to its steady state speed condition. The resulting variable Trs can now be used to evaluate the relative importance of a significantly lengthy deceleration phase, which can subsequently (based on prior characterization of the system in question subjected to different obstructions and operating conditions) be deduced to be contact with an obstacle in the system.

Calculation #1:

Calculate the derivative of a signal then integrate the resulting data samples, using Equation 4 in FIG. 6.

The resulting output from the Equation will be exactly equal to the input signal (Tres(t)= Tf(t)) if the two following conditions are present:

the initial conditions are respected IC=Tf(x=0)

the signal has an absolute value (can be negative)

Principal notion utilized in the "relative speed" calculation

Apply the calculation #1 with the following restrictions:

Condition 1 (C1): Calculate Tres(x) starting with an initial condition of zero (C1= 0)

Condition 2 (C2): Saturate Tres(t) at zero (negative values or not allowed)

Equation 5 in FIG. 6 illustrates the preceding.

Figure 7:
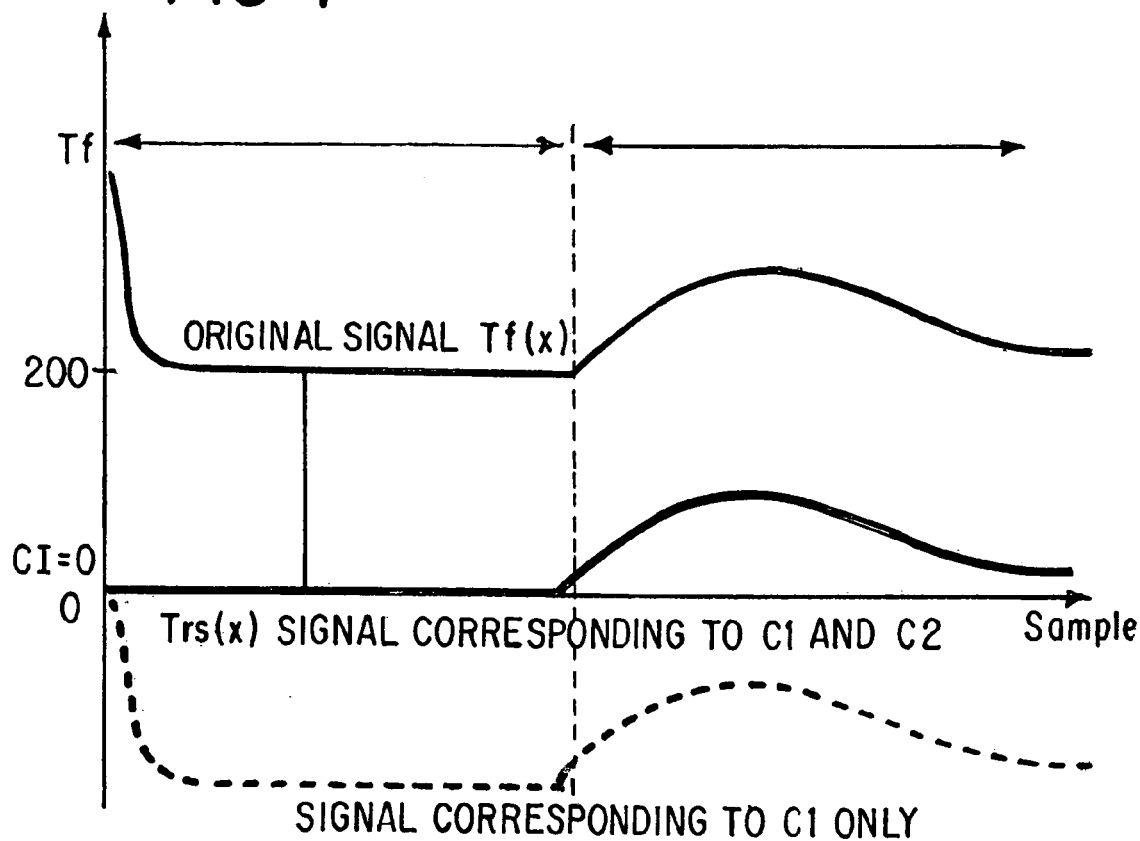
FIGS. 7 and 8 illustrate graphically data produced by the invention.
Figure 8:
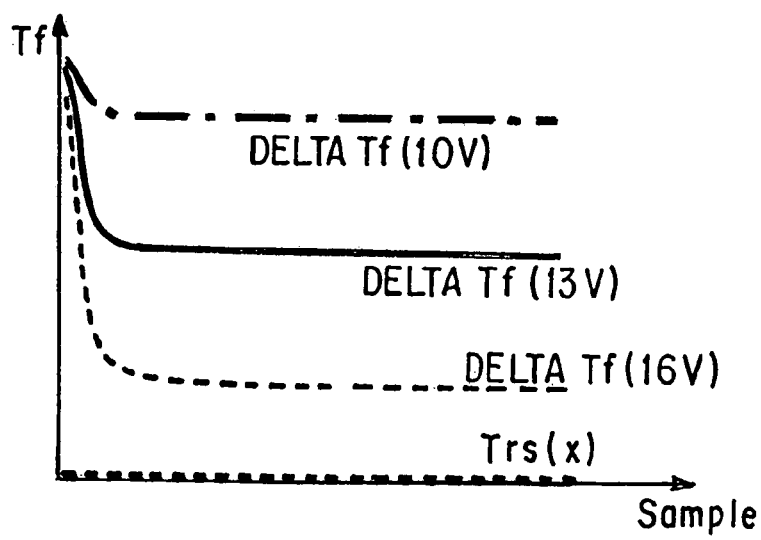

Resulting effect on the signal Tf(k) as presented in Equation 1: The complete start-up transient is removed from the signal when the initial conditions are zero and the negatives values are saturated at zero, as illustrated in FIGS. 7 and 8.

The invention provides the following advantages.

Advantage 1:

The quasi-steady state component Delta Tf is removed from the original signal

The dynamic component of the signal (seen in the S2 phase of the signal) is completely retained Advantage 2:

The signal calculated Trs(f) remains almost zero, irrespective of the prevailing operating conditions voltages, temperature, etc.), even though a different quasi-steady state free speed will be attained (seen in the S1 phase of the signal of FIG. 8).

Advantage AV3:

The signal to noise ratio is always greater than 2, which allows the detection of even very hard/stiff obstacles (65N/mm) with a acceptable load (60N), whilst avoiding incorrect obstacle detection due to system "noise" (high frequency low amplitude fluctuations).

FIGS. 9A–10B are flow charts illustrating processes undertaken by one form of the invention. In overview, the invention first determines a normal speed, or free running speed, of the motor in question. That normal speed may be 3600 rpm, or 100 inches per minute, for example.

It is emphasized that this normal speed is not an eternal constant, but will depend on prevailing environmental conditions, as FIG. 5 indicates. That is, the invention adaptively derives the normal speed.

Then a limit is imposed. The limit may state that speed may not drop by 100 rpm or, equivalently, may not drop to 3500 rpm, or may not drop to 99 inches per minute, and so on.

The invention inquires whether speed has dropped below the limit. If so, it is assumed that an obstacle has blocked the motor, and corrective action is taken, as by stopping, or reversing, the motor.

In another embodiment, the limit is adjusted, based on operating conditions. At high ambient temperature, the limit may be reduced, for example, thus causing a smaller decrease in speed to indicate an obstacle.

In another embodiment, false positives are eliminated. If a sufficient drop in speed is detected, the inquiry is repeated to see if a repeated inquiry will also detect a sufficient drop. If a sufficient number of inquiries successfully detect a drop, then an obstacle is declared to be present.

This discussion will explain FIGS. 9A, 9B, 9C, and 10A and 10B in greater detail.

In FIG. 9A, block 100 indicates that the control 39 in FIG. 4 inquires whether free running speed of the motor 36 has been attained. This inquiry asks whether the motor has reached operating region 103, in plot 105.

From one point of view, block 100 is asking whether motor 36 has completed its initial acceleration.

One approach to implementing the process of block 100 is the following. Assume that the toothed wheel discussed above is used to measure speed. The time required to produce 16 pulses is measured, and is taken as the time for one revolution. (In general, individual pulses are not used, because the tooth spacing of the wheel is not always perfectly uniform. Thus, during one revolution at constant speed, a long pulse may be followed by a short pulse. If individual pulses were used, those two pulses would indicate a speed change, when no speed change actually occurred.)

If the motor is accelerating, the time required for the next 16 pulses will be less. So long as the measured time per revolution is decreasing, that is, the measured time for each successive group of 16 pulses is decreasing, it is assumed that the motor is accelerating. But when the measured time stops decreasing, it is assumed that free running speed is attained.

Of course, other approaches can be used to determine when the motor reaches free running speed.

At this time, when free running speed is attained, block 110 in FIG. 9A declares that event, and sets a baseline speed. This baseline speed acts as a reference point. The free running speed can be used as the baseline. Alternately, zero, or another baseline, can be declared. The baseline acts as a reference point, so that subsequent changes in speed can be measured relative to the baseline.

For example, assume that free running speed is 100 rpm, and that 100 rpm is the baseline. If a deceleration to 98 rpm occurs, a computation can indicate that a change of negative 2 rpm occurred.

As another example, assume the same free running speed, but that the baseline is set to zero. Assume that speed is not computed directly, but that the time for groups of 16 pulses is used to indicate speed. If the measured time for 16 pulses then increases, as occurs when deceleration occurs, the increase is recorded. If the increase continues to occur, the total increase will eventually exceed the baseline limit, although in units of time, as opposed to units of rpm.

Therefore, the baseline serves as a reference point. The units chosen, such as rpm or pulse time, as well as the value of the baseline, are under control of the designer. Some choices may simplify computation, but, again, the baseline acts as a reference to detect drops in speed.

Block 115 then inquires whether any drop from the baseline speed has occurred. For example, if the motor's time-speed trajectory followed dashed path 120 in plot 125, then a drop of 20 units in speed would occur. Block 115 detects this 20 unit drop.

This drop can be detected in the following manner. Assume that motor speed has stabilized, and that $\frac{1}{60}$ second is required to receive 16 pulses, corresponding to a motor speed of one revolution every $\frac{1}{60}$ second, or 60 revolutions per second, or 3600 rpm.

In concept, one may determine whether the motor experiences a deceleration by asking whether more than $\frac{1}{60}$ second are required to receive subsequent groups of 16 pulses. If not, then no deceleration is detected. If so, then a deceleration does occur, indicating the possibility that an obstruction is hindering rotation of the motor.

The Inventor points out that block 115 does not look for acceleration in the motor, but only deceleration.

Figure 10A:
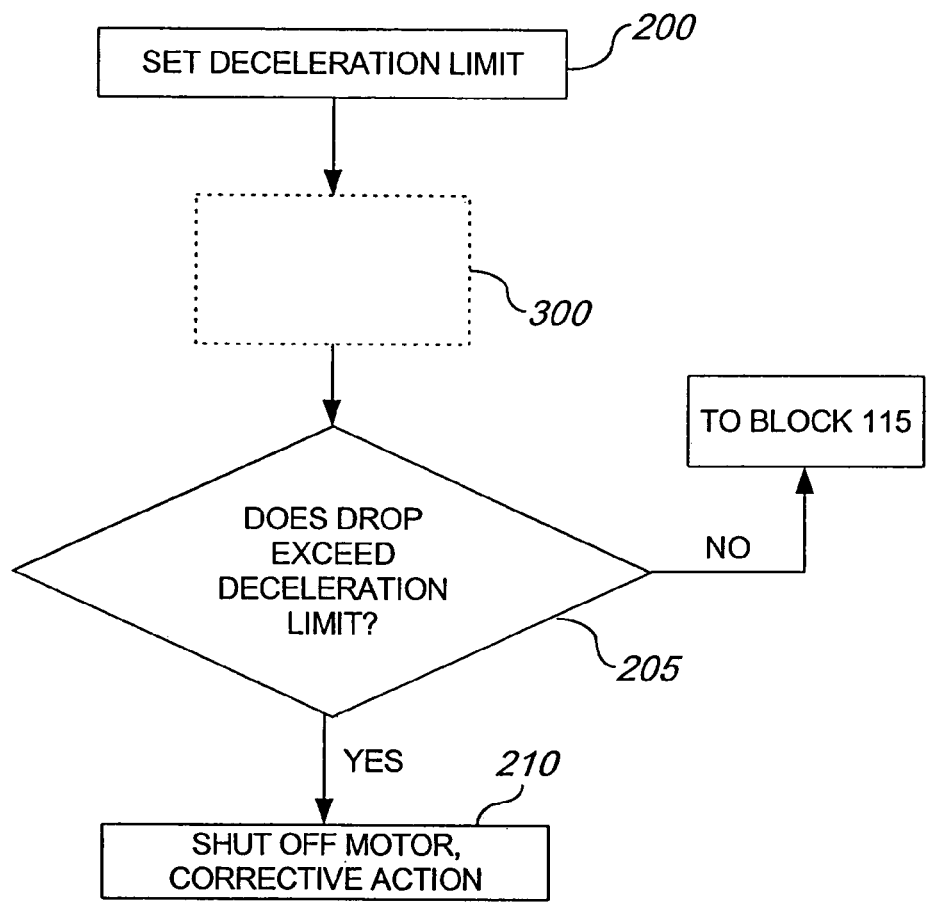
Figure 10B:
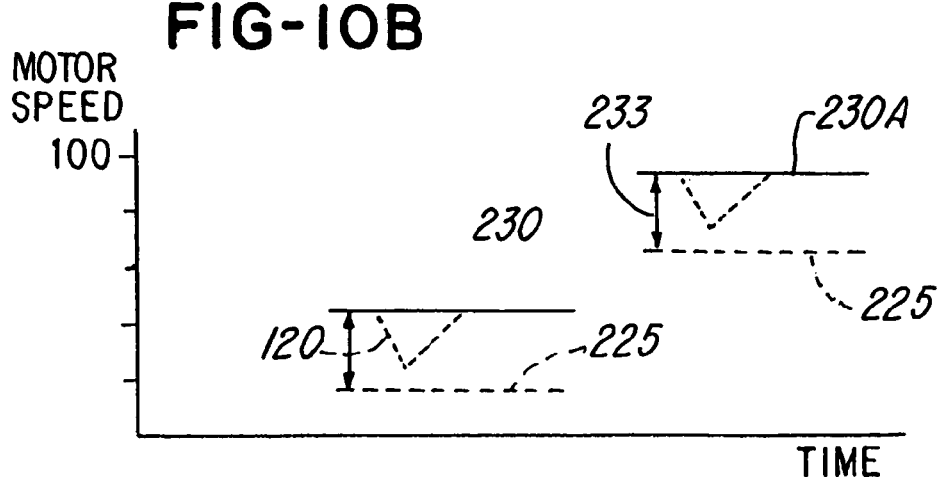

In FIG. 10A, block 200 sets a deceleration limit. This limit could have been set previously, or it could have been fixed in advance by the system designer. One concept behind the deceleration limit is to detect decelerations which are deemed to be caused by obstructions which required shutting down the motor. The deceleration limit, for example, may state that the 20 unit drop in FIG. 6 is excessive.

Block 205 in FIG. 10A inquires whether any drop, computed in block 115 in FIG. 9, exceeds the deceleration limit of block 200. For example, in plot 220, dashed line 225 represents the deceleration limit. Line 230 represents the baseline speed. Dashed line 120 represents a drop in motor speed. Block 205 inquires whether the drop 120 in motor speed exceeds the deceleration limit.

If so, indicating that motor speed has fallen sufficiently, thereby indicating that an obstruction has been struck, then the YES branch is taken, and block 210 shuts off the motor, or takes other corrective action, such as reversing the motor.

If not, indicating that no excessive deceleration has been detected, the NO branch is taken, and the processing returns to block 115 in FIG. 9, and repeats.

A significant feature is that, in one form of the invention, the deceleration limit, indicated by double arrow 233 in FIG. 10, is an absolute number, as opposed to a percentage. Thus, if the baseline speed changes to baseline speed 230A, the deceleration limit 233 remains the same.

From another point of view, the deceleration limit represents a number N. The invention inquires whether speed has dropped below (baseline speed minus N). If so, it is assumed that an obstacle has been struck, and corrective action is taken.

The Inventor points out that the approach of FIGS. 9 and 10, in effect, computes a relative speed, relative to the baseline. If the relative speed indicates an excessive deceleration, corrective action is taken.

In another form of the invention, the baseline is adaptive, and is not an absolute number. That is, if the motor behavior corresponds to that shown in plot 60 in FIG. 5, then the free running speed is that attained at time T1. That speed can be used as the baseline speed. However, if the motor behavior corresponds to that of plot 70 in FIG. 5, then the free running speed is that attained at time T2. That speed can be used as the baseline speed.

Similar comments apply to operation in regions 80 and 85.

It is noted, the baseline speed is different in the two situations. Further, the difference was not determined in advance, but was derived in real time, based on the free running speed attained in each instance.

Thus, from one point of view, the invention detects the free running speed attained by the motor. This free running speed can be called normal operating speed. The invention then sets a deceleration limit, such as limit 233 in FIG. 7. This limit is determined with respect to the free running speed, and is not, in general, an absolute speed.

The invention inquires whether current operating speed falls below the deceleration limit. If so, then an obstacle is assumed present, and corrective action is taken, such as shutting down the motor, or reversing the motor.

Phantom block 300 in FIG. 10A represents optional processes which can be added. For example, the deceleration limit 233 can be altered during operation of the motor.

Assume that system voltage increases during operation of the motor. In this case, the deceleration limit can be decreased. Thus, with a higher system voltage, a smaller deceleration, or a smaller decrease in relative speed, will be taken to indicate presence of an obstruction.

As another example, ambient temperature can change during operation of the motor. The deceleration limit can be decreased in response to the change. Thus, with a higher ambient temperature, a smaller deceleration, or a smaller decrease in relative speed, will be taken to indicate presence of an obstruction.

The change in deceleration limit need not occur during operation of the motor, but can be taken on start up. For example, if the motor starts under the conditions shown in plot 60 in FIG. 5, one deceleration limit can be used. If the motor starts under the conditions of plot 70, another deceleration limit can be used. In either case, the deceleration limit used can be changed, if the environmental variables, such as system voltage and ambient temperature, change.

In another form of the invention, a single excursion past the deceleration limit is not seen as conclusively indicating the presence of an obstruction. Instead, when such an excursion occurs, the invention notes that excursion, and then repeats the inquiry of block 205 in FIG. 10A a specified number of times, such as ten.

If those repeated inquiries indicate that the deceleration limit is truly exceeded, then an obstruction is taken as present. Numerous approaches can be taken. It may be required that all of the ten inquiries indicate that the limit is exceeded. It may be required that a majority of the ten inquiries so indicate, and so on.

This repeated inquiry serves to eliminate false positives.

Numerous substitutions and modifications can be undertaken without departing from the true spirit and scope of the invention. What is desired to be secured by Letters Patent is the invention as defined in the following claims.

What is claimed is:

1. For an electric motor used in a vehicle, which motor reaches different free-running speeds in different operating environments, a method comprising:
   a) after start-up of the motor, establishing a number S1 representing a normal speed;
   b) measuring operating speed S2 of the motor; and
   c) if (S1 minus S2) is a positive number exceeding a predetermined limit, then either shutting down or reversing the motor.

2. Method according to claim 1, and further comprising:
   d) if (S1 minus S2) is a negative number, then continuing operation of the motor.

3. Method according to claim 1, and further comprising:
   d) examining at least one predetermined environmental parameter; and
   e) if said parameter reaches a specified limit, then changing the predetermined limit.

4. Method according to claim 3, wherein the parameter is ambient temperature.

5. Method according to claim 3, and further comprising:
   f) if (S1 minus S2) is found to be a positive number exceeding a predetermined limit in paragraph (e), then repeatedly finding (S1 minus S2) at different times prior to shutting down or reversing the motor.

6. A method, comprising:
   a) maintaining an electric motor in a vehicle, said motor having a steady-state operating speed which changes when temperature and/or system voltage change;
   b) starting the motor;

c) ascertaining steady-state speed of the motor immediately after starting, and setting a baseline speed;
d) measuring speed of the motor while running; and
e) if the sum (baseline speed−measured speed) is a positive number exceeding a predetermined number N, then either shutting off or reversing the motor.

7. Method according to claim 6, and further comprising:
f) changing the number N when predetermined events occur.

8. Method according to claim 6, and further comprising:
f) continuing operation of the motor if measured speed exceeds baseline speed.

9. Method according to claim 6, wherein baseline speed equals steady-state speed of the motor, immediately after initial acceleration.

10. Method according to claim 6, wherein, in paragraph (e), if the sum (baseline speed—measured speed) is found to be a positive number exceeding a predetermined number N, then
f) refraining from shutting off and reversing the motor at that time;
g) repeatedly finding said sum for each of several baseline speeds measured at successive times thereafter; and
h) if a specified number of the sums are all positive and exceeding N, then either shutting off or reversing the motor.

11. A method, comprising:
a) maintaining an electric motor in a vehicle, said motor having a steady-state operating speed which changes when temperature and/or system voltage change;
b) starting the motor;
c) ascertaining steady-state speed of the motor immediately after starting, and setting a baseline speed;
d) measuring speed of the motor while running;
e) if the sum (baseline speed−measured speed) is a negative number, then continuing operation of the motor;
f) if the sum (baseline speed−measured speed) is a positive number exceeding a predetermined number N, thereby indicating that a deceleration of N below baseline has occurred, then either shutting off or reversing the motor;
g) ascertaining whether predetermined events have occurred, and if so, changing the predetermined number N; and
i) repeating processes of paragraphs (a)–(f) at least once.

12. A method of operating a control for an electric motor, which motor reaches different free-running speeds in different operating environments, a method comprising:
a) after start-up of the motor, establishing a number S1 representing a normal speed;
b) measuring operating speed S2 of the motor;
c) computing (S1 minus S2); and
d) if (S1 minus S2) is a positive number exceeding a predetermined limit, then either shutting down or reversing the motor.

13. Apparatus, comprising:
a) an electric motor in a vehicle, said motor having a steady-state operating speed which changes when temperature and/or system voltage change;
b) a control for
i) ascertaining steady-state speed of the motor immediately after starting, and setting a baseline speed;
ii) measuring speed of the motor while running; and
iii) if the sum (baseline speed−measured speed) is a positive number exceeding a predetermined number N, then either shutting off or reversing the motor.

14. Apparatus according to claim 13, and further comprising:
c) means for changing the number N when predetermined events occur.

15. Apparatus according to claim 13, and further comprising:
c) means for continuing operation of the motor if measured speed exceeds baseline speed.

16. Apparatus according to claim 13, wherein baseline speed equals steady-state speed of the motor, immediately after initial acceleration.

17. Apparatus, comprising:
a) an electric motor in a vehicle, said motor having a steady-state operating speed which changes when temperature and/or system voltage change;
b) means for
i) ascertaining steady-state speed of the motor immediately after starting, and setting a baseline speed;
ii) measuring speed of the motor while running;
iii) if the sum (baseline speed−measured speed) is a negative number, then continuing operation of the motor;
iv) if the sum (baseline speed−measured speed) is a positive number exceeding a predetermined number N, thereby indicating that a deceleration of N below baseline has occurred, then either shutting off or reversing the motor;
v) ascertaining whether predetermined events have occurred, and if so, changing the predetermined number N; and
vi) repeating processes of paragraphs (a)–(f) at least once.

18. For an electric motor used in a vehicle, which motor reaches different free-running speeds in different operating environments, apparatus comprising:
a) means for establishing a number S1 representing a normal speed after start-up of the motor;
b) means for measuring operating speed S2 of the motor; and
c) means for either shutting down or reversing the motor, if (S1 minus S2) is a positive number exceeding a predetermined limit.

19. Apparatus according to claim 18, and further comprising:
d) means for examining at least one predetermined environmental parameter, and if said parameter reaches a specified limit, then changing the predetermined limit.

20. Apparatus according to claim 19, wherein the parameter is ambient temperature.

21. Method according to claim 1, and further comprising:
d) using the motor to operate a window.

22. Method according to claim 6, and further comprising:
f) using the motor to operate a window.

23. Method according to claim 11, and further comprising:
j) using the motor to operate a window.

24. Method according to claim 12, and further comprising:
e) using the motor to operate a window.

25. Apparatus according to claim 13, and further comprising:
c) a window which the motor operates.

26. Apparatus according to claim 17, and further comprising:
c) a window which the motor operates.

27. Apparatus according to claim 17, and further comprising:
c) a window which the motor operates.

28. Apparatus according to claim 18, and further comprising:
   d) a window which the motor operates.

29. For an electric motor in a vehicle, and a sensor associated with the motor which produces a train of pulses wherein time intervals between adjacent pulses are inversely proportional to motor speed, a method comprising:
   a) starting the motor, thereby causing the motor to accelerate, thereby causing the time intervals to progressively decrease;
   b) monitoring the time intervals;
   c) ascertaining a termination in the decrease of the time intervals and declaring then-current motor speed as free running motor speed; and
   d) after step (c), using a collection of the time intervals to determine whether motor speed deviates from free running speed by a predetermined amount and, if so, either shutting down or reversing the motor.

30. Method according to claim 29, wherein the pulses are produced by a tooth wheel driven by the motor, wherein each tooth excites the sensor.

31. Method according to claim 29, wherein the motor drives a powered window.

32. Method according to claim 29, wherein the determining step of paragraph (d) comprises ascertaining whether a number N sequential pulses occupy a time greater than a predetermined time T.

33. For an electric motor in a vehicle, and a sensor associated with the motor which produces a train of pulses wherein time intervals between adjacent pulses are inversely proportional to motor speed, a method comprising:
   a) each time the motor starts, setting a baseline reference, wherein the baseline reference under first environmental conditions is different from the baseline reference under second environmental conditions; and
   b) after the baseline reference is set, determining whether a predetermined number N of sequential pulses occupies more than a predetermined time T and, if so, either shutting down or reversing the motor.

34. Method according to claim 33, wherein the pulses are produced by a toothed wheel on a shaft of the motor, wherein each tooth excites the sensor.

35. Method according to claim 33, wherein the motor drives a powered window.

36. Method according to claim 33, wherein motor speed can be computed from N and T, and motor speed immediately prior to shut-down or reversal as in paragraph (b) is less than that corresponding to the baseline reference.

37. Method according to claim 33, wherein the relationship between N and T is predetermined, and does not change as environmental conditions change.

38. For an electric motor in a vehicle, and a sensor associated with the motor which produces a train of pulses wherein time intervals between adjacent pulses are inversely proportional to motor speed, and wherein the time intervals decrease during startup of the motor, apparatus comprising:
   a) means for ascertaining a termination in the decrease of the time intervals and declaring then-current motor speed as free running motor speed; and
   d) means for using a collection of the time intervals to determine whether motor speed deviates from free running speed by a predetermined amount and, if so, either shutting down or reversing the motor.

39. Apparatus according to claim 38, wherein the pulses are produced by a toothed wheel on a shaft of the motor, wherein each tooth excites the sensor.

40. Apparatus according to claim 38, wherein the motor drives a powered window.

41. For an electric motor in a vehicle, and a sensor associated with the motor which produces a train of pulses wherein time intervals between adjacent pulses are inversely proportional to motor speed, apparatus comprising:
   a) means for setting a baseline reference each time the motor starts, wherein the baseline reference under first environmental conditions is different from the baseline reference under second environmental conditions; and
   b) means for determining, after the baseline reference is set, whether a predetermined number N of sequential pulses occupies more than a predetermined time T and, if so, either shutting down or reversing the motor.

42. Apparatus according to claim 41, wherein the pulses are produced by a toothed wheel on a shaft of the motor, wherein each tooth excites the sensor.

43. Apparatus according to claim 41, wherein the motor drives a powered window.

44. Apparatus according to claim 41, wherein motor speed can be computed from N and T, and motor speed immediately prior to shut-down or reversal as in paragraph (b) is less than that corresponding to the baseline reference.

45. Apparatus according to claim 41, wherein the relationship between N and T is predetermined, and does not change as environmental conditions change.

46. Method according to claim 32, wherein motor speed can be computed from N and T, and motor speed immediately prior to shut-down or reversal as in paragraph (b) is less than that corresponding to the baseline reference.

* * * * *